United States Patent
Fujita et al.

(10) Patent No.: US 6,561,738 B1
(45) Date of Patent: May 13, 2003

(54) SPECTACLES LENS BORING JIG POSITIONING DEVICE

(75) Inventors: Hakaru Fujita, Tokyo (JP); Yukihiro Izumitani, Tokyo (JP)

(73) Assignee: Hoya Corporation, Tokyo (JP)

( * ) Notice: Subject to any disclaimer, the term of this patent is extended or adjusted under 35 U.S.C. 154(b) by 142 days.

(21) Appl. No.: 09/744,680

(22) PCT Filed: Oct. 19, 2000

(86) PCT No.: PCT/JP00/07259

§ 371 (c)(1),
(2), (4) Date: Feb. 9, 2001

(87) PCT Pub. No.: WO01/28720

PCT Pub. Date: Apr. 26, 2001

(30) Foreign Application Priority Data

Oct. 20, 1999 (JP) .......................................... 11-298634

(51) Int. Cl.[7] ............................................. B23B 45/14
(52) U.S. Cl. ....................... 408/97; 408/103; 408/115 R
(58) Field of Search ............................... 408/115 R, 91, 408/97, 103, 109

(56) References Cited

U.S. PATENT DOCUMENTS

| | | | | |
|---|---|---|---|---|
| 2,816,465 A | * | 12/1957 | Honnef | 33/567 |
| 2,860,532 A | * | 11/1958 | Zickafoose, Jr. | 408/704 |
| 3,876,325 A | * | 4/1975 | Clark | 408/1 R |
| 4,057,358 A | * | 11/1977 | Young | 144/35.1 |
| 5,423,578 A | | 6/1995 | Kanomata et al. | |
| 5,646,706 A | | 7/1997 | Izumitani | |
| 5,733,077 A | * | 3/1998 | MacIntosh, Jr. | 408/103 |
| 6,244,792 B1 | * | 6/2001 | Watanabe | 408/1 R |

FOREIGN PATENT DOCUMENTS

| | | | | |
|---|---|---|---|---|
| CA | 1261178 A | * | 9/1989 | 408/115 R |
| EP | 0 718 660 A1 | | 6/1996 | |
| JP | 236409 A | * | 10/1986 | 408/115 R |
| JP | A 6-265072 | | 9/1994 | |
| JP | U 3010786 | | 2/1995 | |
| JP | A 7-230062 | | 8/1995 | |
| JP | A 9-239632 | | 9/1997 | |
| JP | A 9-290399 | | 11/1997 | |
| JP | A 9-300229 | | 11/1997 | |
| JP | A 11-104997 | | 4/1999 | |
| WO | WO 99/37449 | | 7/1999 | |

* cited by examiner

Primary Examiner—Daniel W. Howell
(74) Attorney, Agent, or Firm—Oliff & Berridge PLC

(57) ABSTRACT

The present invention accurately positions and affixes by a simple device and operations a drilling jig for processing non-through-holes from the edge of an edged spectacle lens toward the inside of the lens.

The above-mentioned lens is held and positioned using a blocking jig, which is attached to an edged spectacle lens, and, in addition, a drilling jig is positioned using a feed-set guide base and guide stopper.

7 Claims, 10 Drawing Sheets

1: LENS
11: NON-THROUGH-HOLES
21: BRIDGE
22: END-PIECE
23: PROTUBERANCE

SPECTACLES LENS BORING JIG POSITIONING DEVICE

BACKGROUND OF THE INVENTION

1. Field of Invention

The present invention relates to a positioning device for positioning a spectacle lens drilling jig utilized for processing a non-through-hole from the edge of a spectacle lens toward the inside of the lens.

2. Description of Related Art

Rimless-type spectacles have been attracting attention in recent years due to the advantages of a wider field of vision and lighter weight, and as a new type of this rimless spectacles, a method for forming a non-through-hole from the edge of a spectacle lens toward the inside of the lens, and using this non-through-hole for directly connecting to a spectacle lens, an end-piece or bridge and other such frame members is known (Japanese Patent Laid-open No. H7-230062).

FIG. 16 shows an example of the external appearance of the above-mentioned new type of rimless spectacles.

As shown in this figure, the above-mentioned new type of spectacle lenses connect bridge 21 and end-piece 22 to spectacle lens 1 by inserting a pair of protruding portions 23, 23 integrally formed onto both bridge 21 and end-piece 22 into non-through-holes 11, 11 in the edges of the lens, and affixing same in this inserted state with an adhesive or the like.

This new type rimless spectacles is advantageous in that, in comparison to the heretofore rimless spectacles generally referred to as either two-point or three-piece rimless spectacles, the screws that pass completely through the lens surface in the thickness direction can be eliminated, thus enlarging the effective field of vision, and making the spectacles lighter weight. In addition, this new type rimless spectacles is also advantageous in that when wiping the lenses clean, the lack of protrusions makes wiping easy.

To form non-through-holes 11, 11 in the edge of a spectacle lens 1, a drilling jig 3 like that shown in FIGS. 14 and 15 is utilized (Japanese Patent Laid-open No. H7-230062).

FIGS. 14 and 15 show a method for forming a non-through-hole in the edge of a spectacle lens using a drilling jig.

FIG. 14 shows a state in which drilling jigs 3, 3 are respectively affixed to both edges of spectacle lens 1. Further, FIG. 15 shows an exploded view of one portion thereof.

As shown in this figure, drilling jig 3 is shaped like a small block, and is provided with a pair of through guide holes 31, 31. An edge of this drilling jig 3 is affixed to a predetermined location on an edge of a spectacle lens using two-sided adhesive tape, and thereafter, a step-type pivot drill 33, which has a hole-depth-regulating step disposed on the shaft portion, is inserted into the above-mentioned through guide holes 31, 31 and non-through-holes 11, 11 are formed.

In accordance therewith, non-through-holes 11, 11 of the same spacing as the spacing of the pins of the protruding portions 23, 23 of the bridge 21 and end-piece 22 sides can be easily drilled without using large, expensive processing equipment, such as, for example, a numerically controlled general-purpose milling machine. Further, since the above-mentioned drilling jig 3 is a small block shape, and moreover, is a small-scale and simply structured member having only a pair of through guide holes 31, 31, it is easy to prepare types of drilling jigs 3 that correspond to the different lens shapes of a spectacle lens 1. In other words, no matter what shape a lens 1 might be, it can be handled easily by simply processing (cutting and forming) one edge of a drilling jig 3 to match the curve of the lens edge.

However, in processing the above-mentioned non-through-holes, it was not easy to accurately position and attach a drilling jig 3 to a predetermined drilling location on a spectacle lens edge.

As one method of doing so, there is a method whereby a chart is used and positioning is done by visual observation. In this method, a edged lens is placed on top of a chart on which a reference line corresponding to the shape thereof has been drawn, and using the reference line on this chart as a criteria, a drilling jig is positioned and attached to a predetermined drilling location on the edge of the lens.

However, with this method, there are cases in which a lens cannot be stably placed on a chart due to the lens shape, and further, due to errors that occur as a result of parallax, a great deal of skill is required to perform this work accurately and with good repeatability.

Another method that can be considered is a method whereby a formed jig for securing lens, which affixes an entire lens by having same fitted therein, is used, and a drilling jig is inserted into a space formed beforehand in a prescribed location in this fixing jig, and is attached to the lens edge.

However, this method requires a formed jig for securing lens, which is large enough to enclose an entire lens, and, in addition, since this formed jig for securing lens cannot be used if the shape of the lens changes even slightly, the problem occurs wherein extremely numerous types of formed jigs for securing lens must be readied. For example, even in a case in which a formed jig for securing lens has the same shape as the curved shape of a drilling part, and the same type drilling jig can be used, if the contour shape of a portion of the lens other than the drilling part thereof differs even slightly, a jig that conforms to the different contour shape thereof must be readied. In this manner, in a method, which uses a formed jig for securing lens, the problem occurs of not being able to handle the varied and diverse preferences of spectacle wearers.

With the foregoing problems in view, it is an object of the present invention to provide a positioning device for positioning a spectacle lens drilling jig, which, by its simple structure and simple operation, makes it possible to position accurately and with good repeatability a drilling jig for processing a non-through-hole from an edge of a spectacle lens toward the inside of the lens for a wide variety of lens shapes.

SUMMARY OF THE INVENTION

The invention is a positioning device for positioning a spectacle lens drilling jig, characterized in that it comprises lens holder which holds an edged spectacle lens affixed to a blocking jig, while determining the position in the direction of rotation via the above-mentioned blocking jig; biaxial free moving device which freely moves the above-mentioned lens holder up-down and right-left, respectively, relative to a lens surface in a state in which the position in the direction of rotation is fixed; a jig guide base having a guide surface on which a small block-shaped drilling jig is placed in a freely moving manner in the direction of the surface; a guide stopper, which has a guide wall surface formed as the surface for intersecting with the abovementioned guide surface, and which comes in contact with and positions the above-mentioned drilling jig, which is guided on the above-mentioned guide surface by this guide wall surface; and feeder which feeds the above-mentioned jig guide base, together with the above-mentioned stopper, in the fore-aft direction relative to the above-mentioned lens surface.

A first preferred feature of the positioning device for positioning a spectacle lens drilling jig is characterized in that it comprises a magnetically clamping device which magnetically clamps to the guide wall surface of the guide stopper on one side of a drilling jig placed on the guide surface of the jig guide base.

A second preferred feature of the positioning device for positioning a spectacle lens drilling jig is characterized in that the guide surface on the jig guide base is inclined in the direction of the lens edge.

A third preferred feature of the positioning device for positioning a spectacle lens drilling jig is characterized in that the guide surface of the jig guide base and guide wall surface of the guide stopper are both formed so as to be symmetrical on the right and left.

A fourth preferred feature of the positioning device for positioning a spectacle lens drilling jig is characterized in that the feeder includes a means capable of reading the numerical value of the feed position of the jig guide base and guide stopper.

As described above, it is possible, via a simple structure and simple operations, to position accurately and with good repeatability a drilling jig for processing a non-through-hole from an edge of a spectacle lens toward the inside of the lens for a wide variety of lens shapes.

In addition thereto, it is possible to make a series of operations, from the edging of a lens blank to a drilling process, more efficient.

In accordance therewith, it is possible to achieve the above-mentioned object.

BRIEF DESCRIPTION OF THE DRAWINGS

The invention will be described with reference to the drawings in which.

DETAILED DESCRIPTION OF PREFERRED EMBODIMENTS

Figure 1:
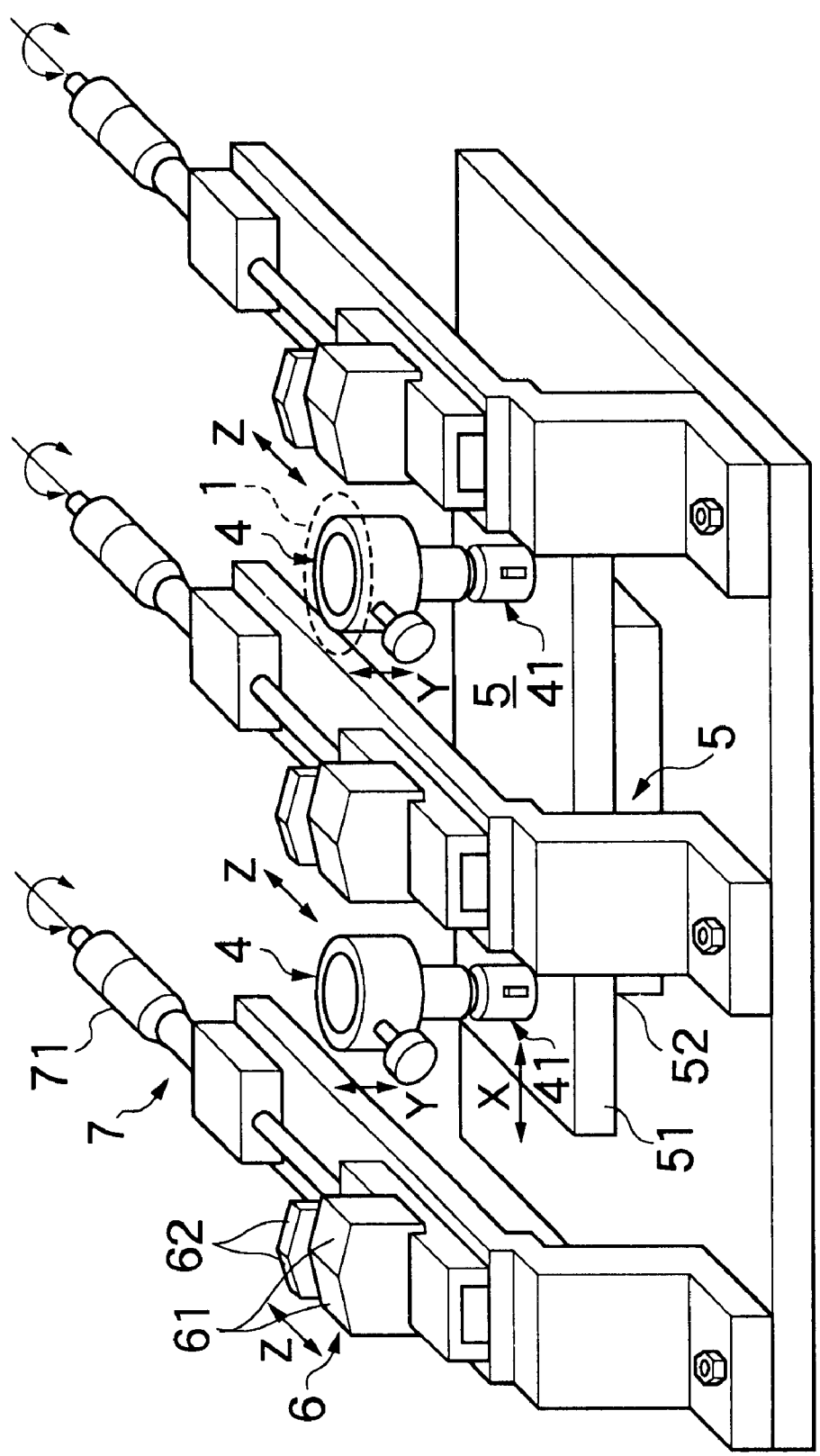
FIG. 1 is a simplified oblique view showing the constitution of a positioning device for positioning a spectacle lens drilling jig according to the present invention.

The preferred features of the invention will be explained hereinbelow by referring to the figures.

Furthermore, the same reference numerals indicate the same or equivalent parts in each figure.

FIG. 1 is a simplified oblique view showing a positioning device for positioning a spectacle lens drilling jig according to the invention.

The device shown in the figure is used for processing non-through-holes 11, 11 from an edge of a spectacle lens 1 toward the inside of the lens, and the main portions thereof are constituted from lens holder 4, biaxial free moving device 5, a jig guide base 6, a guide stopper 62, and feeder 7.

Lens holder 4 holds an edged spectacle lens, which is mounted in a blocking jig 8, while a position in the direction of rotation (rotation about the y-axis) is determined by the blocking jig 8 thereof.

Spectacle lenses 1 undergo edging one at a time to tailor them to the preferences of an spectacles wearer, and the edging thereof is performed in a state wherein a plastic blocking jig 8 is affixed either by two-sided adhesive tape or a suction cup to a predetermined location near the center of the surface of a lens blank. Lens holder 4 affixes a lens 1 in a constant rotational position using the blocking jig 8 to which the lens 1 was mounted for the edging thereof.

Biaxial free moving device 5 freely moves the above-mentioned lens holder 4 up-down (along the y-axis) and right-left (along the x-axis), respectively, relative to a lens surface in a state in which the position in the direction of rotation is fixed. This biaxial free moving device 5 is constituted from a vertical guide mechanism 41 for freely moving lens holder 4 in the up-down direction (along the y-axis) relative to a lens surface, and a horizontal guide mechanism 52 for freely moving a movable base 51, to which lens holder 4 is mounted, in the right-left direction (along the x-axis) relative to a lens surface.

Jig guide base 6 has a jig guide surface 61 for placing a small block-shaped drilling jig 3 in a freely moving fashion in the direction of the surface. In the example shown in the figure, this jig guide surface 61 is inclined in the direction of the edge of a lens 1, and, in addition, this guide surface 61 is formed in right-left symmetrical pairs for each guide base 6.

A guide stopper 62 is either formed integrally with the above-mentioned jig guide base 6, or is bolted thereto, and has a guide wall surface formed as a surface for intersecting with the above-mentioned jig guide surface 61. This guide wall surface, similar to jig guide surface 61, is formed in right-left symmetrical pairs for each guide stopper 62. The constitution is such that a drilling jig 3 is positioned in the fore-aft direction (along the z-axis) by one side of the drilling jig 3, which is guided atop the above-mentioned jig guide surface 61, abutting against this guide wall surface.

Furthermore, the constitution is such that magnetically clamping device, such as a permanent magnet not shown in the figure, is embedded in this guide stopper 62, and one side of a drilling jig 3 placed on the above-mentioned guide surface 61 is magnetically clamped thereto. In accordance therewith, a drilling jig 3 is more securely positioned by the guide wall surface formed by the guide stopper 62.

Feeder 7 feeds the above-mentioned jig guide base 6, together with the above-mentioned guide stopper 62 in the fore-aft direction (along the z-axis) relative to the above-mentioned lens surface. This feeder 7 is constituted such that precision feed rate adjustments are made possible by using a micrometer feed mechanism 71. In this case, it is desirable that this micrometer feed mechanism 71 be equipped with a scale, (unlabeled) shown in FIGS. 3 and 5, so as to enable this feed rate to be read directly as numerical values. Furthermore, so that backlash does not occur in the feed movement action resulting from the above-mentioned feed mechanism 71, it is desirable to provide as necessary a spring for giving the above-mentioned guide base 6 constant elastic bias in either the fore or aft direction.

Figure 2:
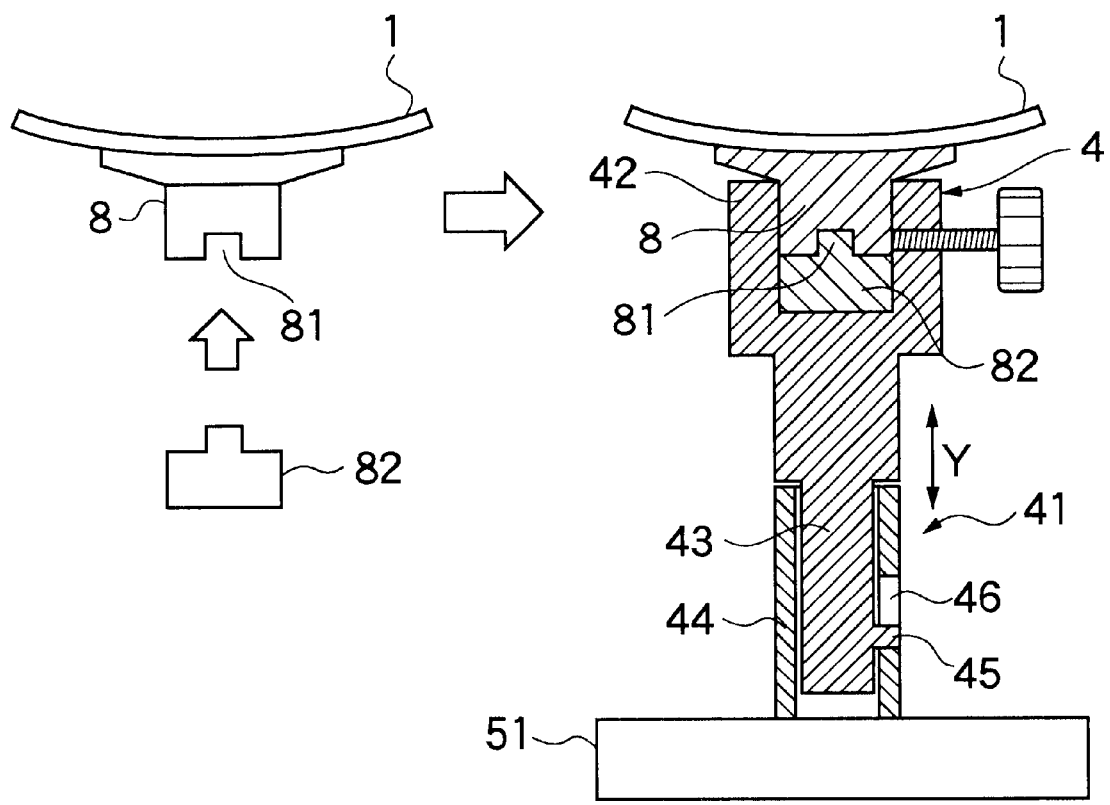
FIG. 2 is a partial cross-sectional view showing a detailed example of the constitution in the vicinity of lens holder of the invention.

FIG. 2 shows an example of the detailed constitution in the vicinity of lens holder 4.

As shown in this figure, lens holder 4 is constituted from a cylindrical chuck portion 42, into which a blocking jig 8 affixed to an edged lens 1 is inserted, a columnar leg portion 43 for supporting this chuck portion 42, and a cylindrical cylinder portion 44 for guiding the movement of this leg portion 43 in the up-down direction (along the y-axis). In addition thereto, in the above-mentioned leg portion 43 and the above-mentioned cylinder portion 44, there is disposed a protuberance 45 and a slit 46 for mating with and guiding this protuberance only in the up-down direction so as to hold the position of rotation of the chuck portion 42 constant.

A blocking jig 8 for processing purposes is affixed via either two-sided adhesive tape or a suction cup to a lens 1, which has just undergone edging, and a notch portion 81 is disposed in this blocking jig 8 for positioning in the direction of rotation. The blocking jig 8 is held by this notch portion 81 such that the position in the direction of rotation becomes constant.

82 is an auxiliary jig for positioning, and this auxiliary jig 82 is inserted and affixed beforehand inside the chuck portion 42.

The entire lens holder 4 described hereinabove is mounted on top of a movable base 51, and this movable base 51 is supported by a linear ball bearing so as to move freely in the right-left direction (along the x-axis).

Figure 3:
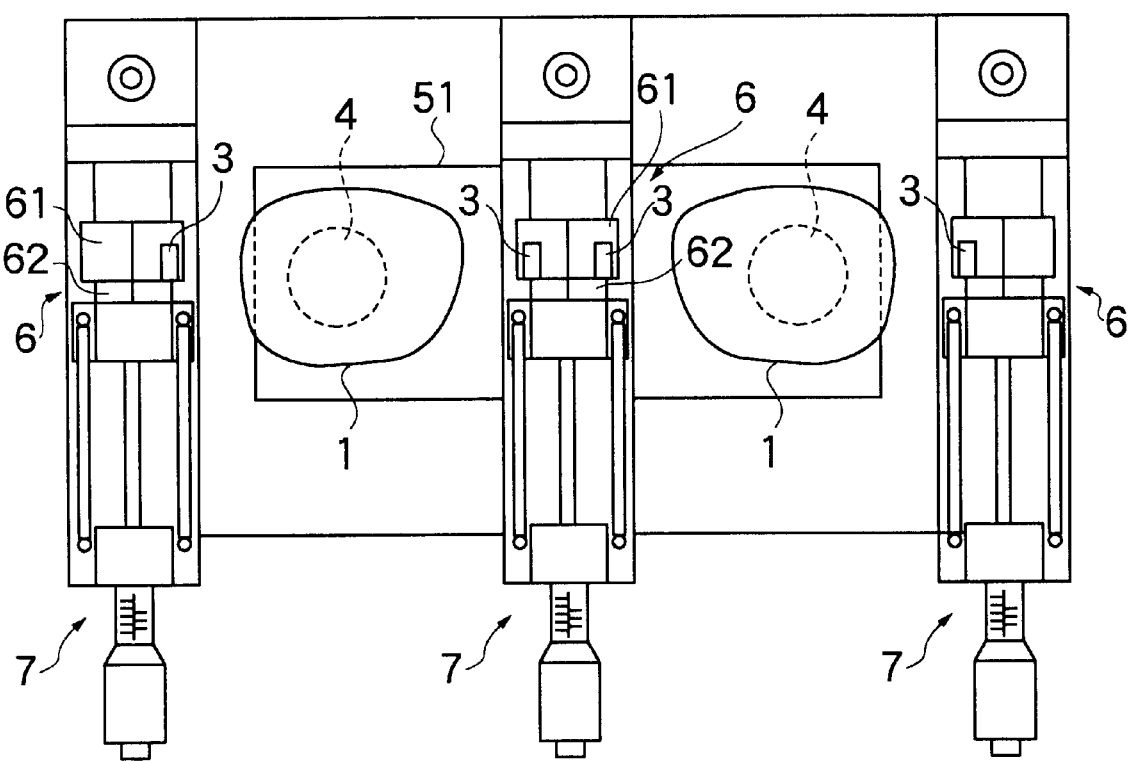
FIG. 3 is a partial schematic diagram showing a state wherein the device of the invention is viewed from the top.
Figure 4:
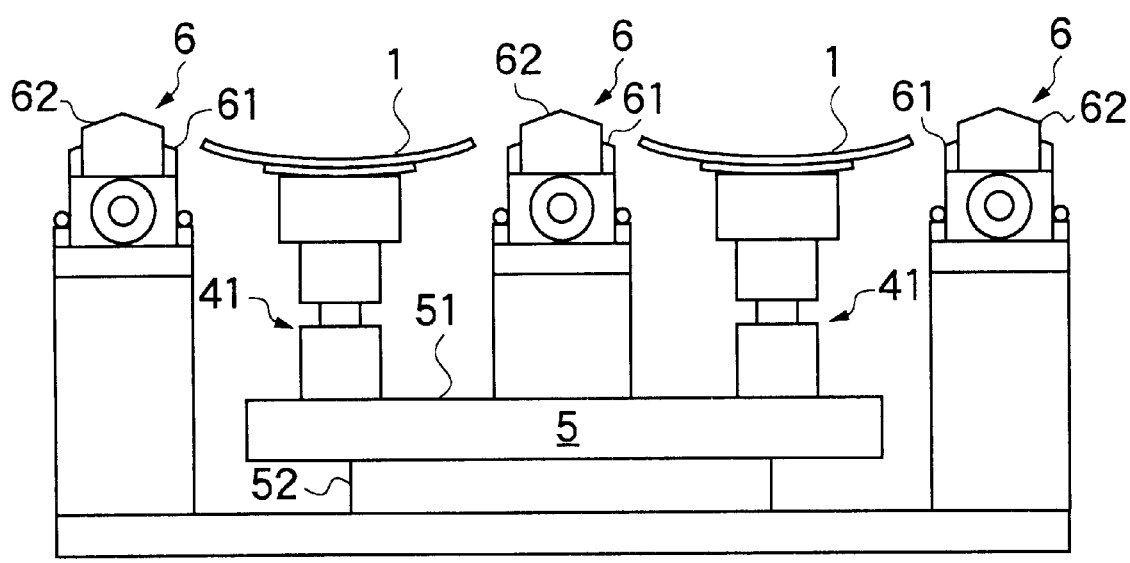
FIG. 4 is a partial schematic diagram showing a state wherein the device of the invention is viewed from the front.

FIG. 3 shows a state, wherein the device of the invention is viewed from above, and FIG. 4 shows a state, wherein the device of the invention is viewed from the front, respectively.

Figure 5:
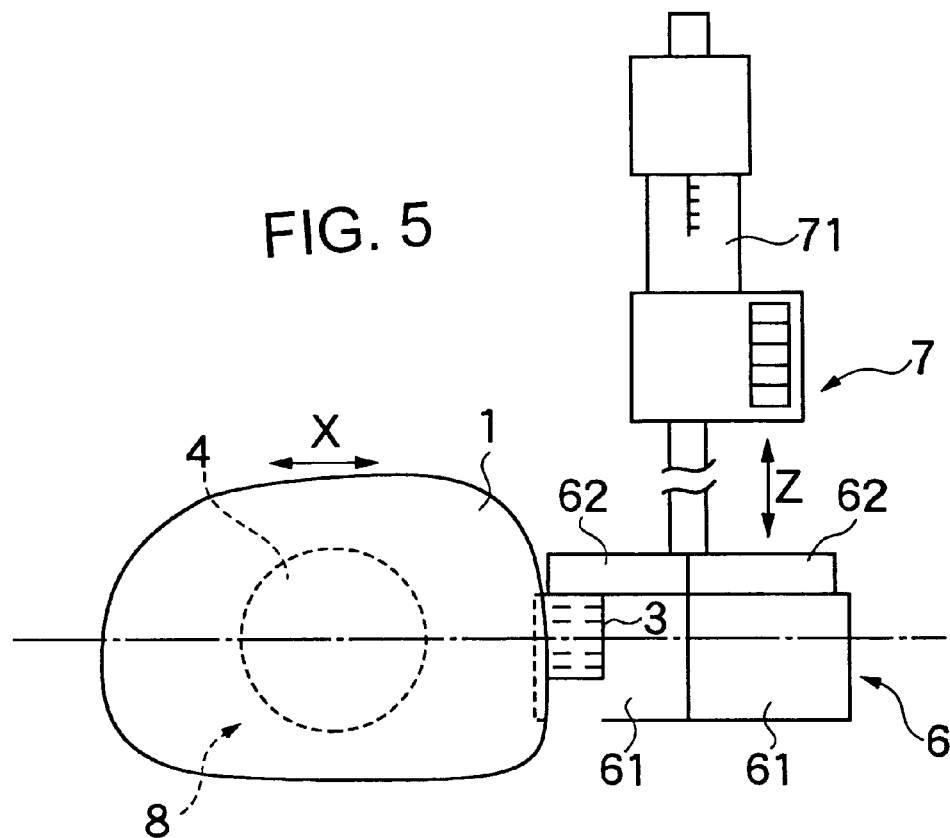
FIGS. 5 and 6 are diagrams showing the state when a drilling jig is positioned on a lens edge by the device of the present invention.

As shown in FIGS. 4 and 5, in a state, wherein an edged lens 1 is held in a constant rotational position by lens holder 4, it is possible to freely move lens holder 4 in the up-down direction (along the y-axis) and right-left direction (along the x-axis), respectively, by holding and moving by hand the chuck portion 42 of the lens holder 4 thereof. In accordance therewith, the lens 1 held in lens holder 4, as shown in FIG. 5, can be moved such that the edge thereof lies over the guide surface 61 atop the jig guide base 6.

Figure 6:
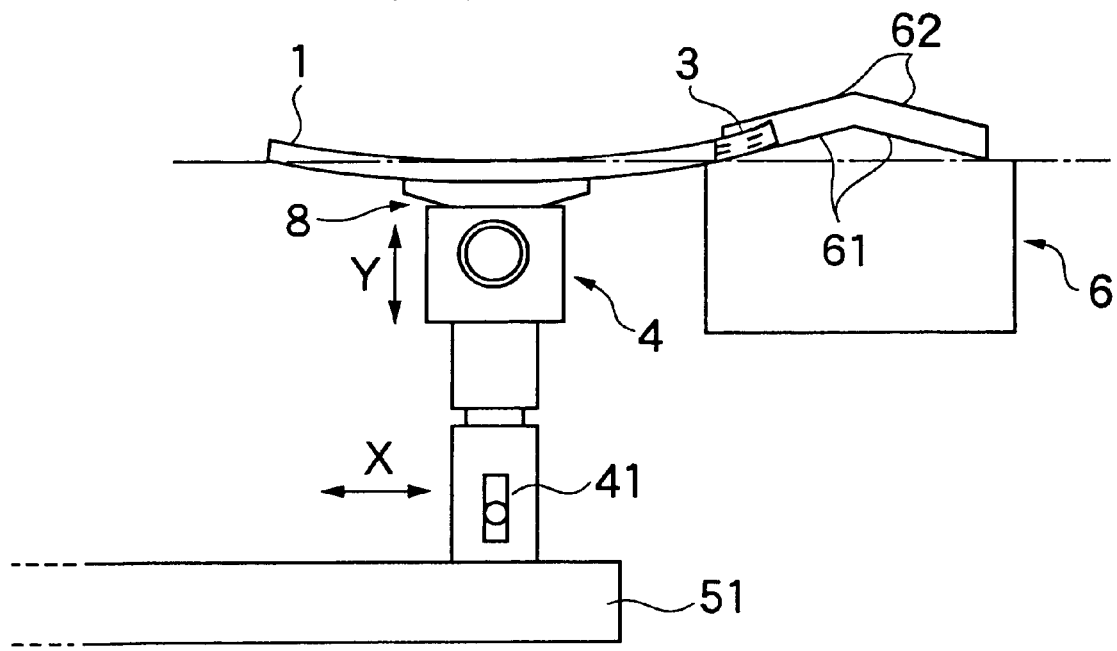

FIGS. 5 and 6 show the state of the invention when a drilling jig 3 is positioned on the edge of a lens.

FIG. 5 shows the state viewed from above, and FIG. 6 shows the state viewed from the front, respectively.

The edge of a lens 1 held in lens holder 4 is placed in a state, wherein same overlies the jig guide surface 61 atop the jig guide base 6 by about 1–2 millimeters.

The jig guide base 6 and guide stopper 62 are constituted either integrally, or by bolt fastening, and the position of the jig guide base 6 and guide stopper 62 in the fore-aft direction (along the z-axis) relative to a lens 1 on top of holder 4 is variably set by the above-mentioned feeder 7. The feed rate for determining a position in this fore-aft direction is determined beforehand for each type of lens shape.

By feeding jig guide base 6 and guide stopper 62 at only a predetermined rate, it is possible to position this guide base 6 and guide stopper 62 with repeatability in a predetermined position in the fore-aft direction (along the z-axis).

In this positioned state, a small block-shaped drilling jig 3 is placed on the guide surface 61 on top of the guide base 6, and one surface of the drilling guide (one side) is clamped to the surface (guide wall surface) of the guide stopper 62 by a permanent magnet embedded in the guide stopper 62. Then, while pushing the jig 3 on top of the above-mentioned guide surface 61 gently by finger, and moving same along the guide wall surface formed by the guide stopper 62, it is possible to position the edge of this jig 3 on the edge of a lens. Therefore, if two-sided adhesive tape is attached beforehand to the edge of either one of this jig 3 or lens 1, the drilling jig 3 can be accurately attached and affixed to a predetermined position of a lens edge by a simple moving operation on top of guide base 6.

As explained hereinabove, with the above-described device, it is possible to position a drilling jig 3 relative to a lens edge accurately and with good repeatability for each type of lens shape thereof by determining beforehand for each type of lens shape of a lens 1 the shape of the drilling jig 3 and the feed position in the fore-aft direction of the jig guide base 6.

Figure 7:
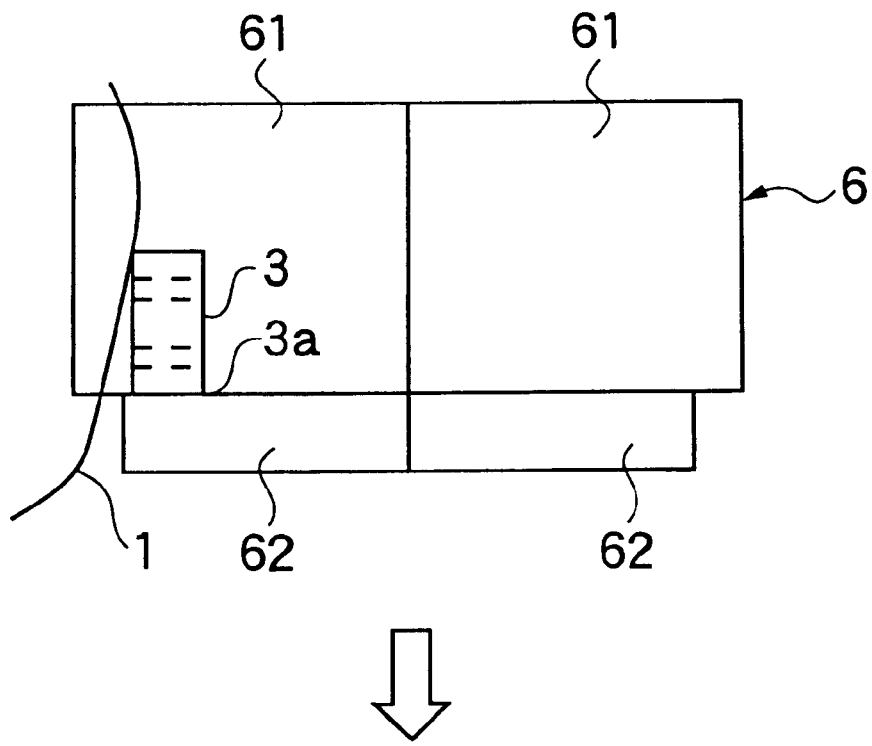
FIGS. 7 and 8 are diagrams showing another state when a drilling jig is positioned on a lens edge by the device of the invention.
Figure 8:
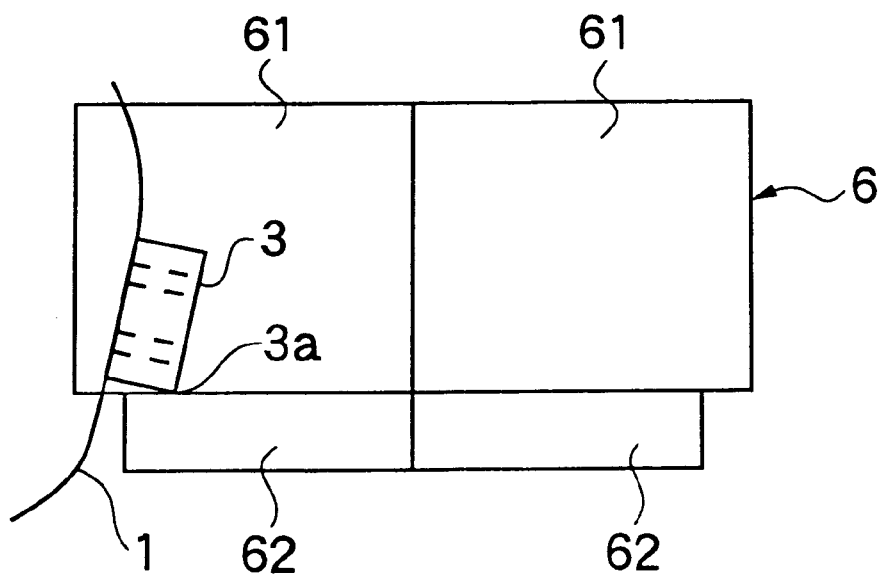
Figure 9:
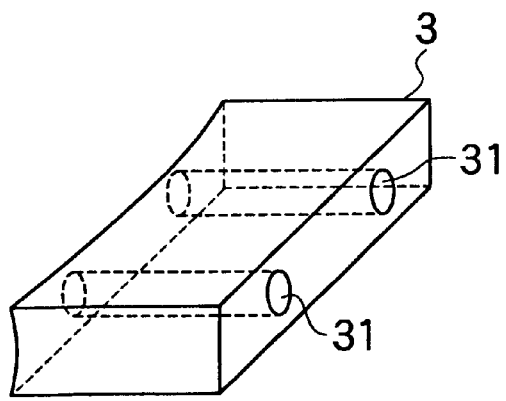
FIGS. 9, 10, 11, and 12 are oblique views showing examples of shapes of drilling jigs used with the device of the invention.
Figure 10:
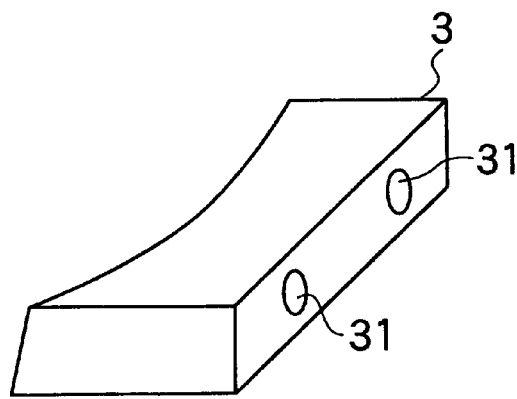
Figure 11:
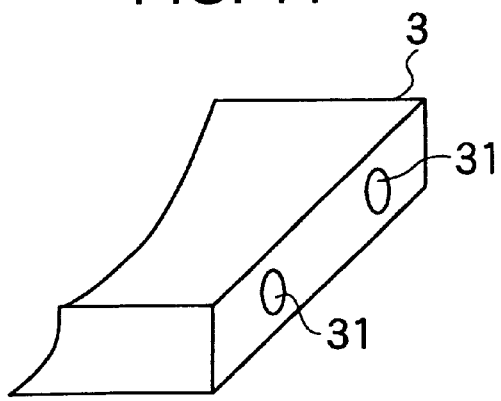
Figure 12:
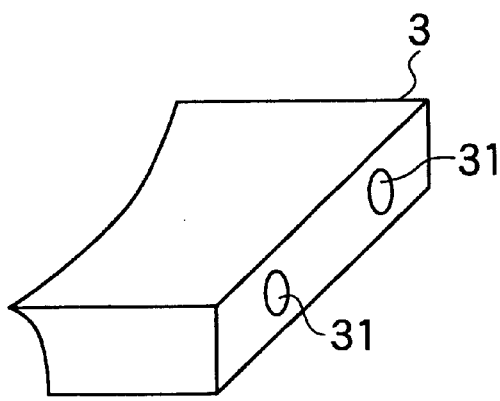

FIGS. 7 and 8 show a separate state of the invention when a drilling jig 3 is positioned on a lens edge.

As shown in FIG. 7, according to the curved shape of the lens edge, there are also cases in which it is difficult to match the entire edge of this jig 3 to the edge of a lens 1 when in a state, wherein the entire side of the drilling jig 3 is exactly aligned with the guide stopper 62.

In a case such as this, as shown in FIG. 7, in a state, wherein a drilling jig 3 that is moved on top of guide surface 61 while being aligned with guide stopper 62 first touches the edge of a lens, by rotating the jig 3 while sliding the jig 3 such that point 3*a* in the figure does not separate from guide stopper 62, as shown in FIG. 8, geometrically computable positioning can be performed beforehand even in accordance with moving the entire edge of jig 3 to the edge of a lens.

FIGS. 9–12 show an example of a shape of a drilling jig 3 used in a device of the invention.

As shown in FIGS. 9–12, respectively, of this figure, because each drilling jig 3 is an extremely simply structured part of only through guide holes 31, 31 formed in respective simple block-shaped members, it is easy to prepare types that correspond to different lens shapes of spectacle lenses 1. The shape of this drilling jig 3, especially the shape of the edge, is formed according to various factors, such as the thickness of a spectacle lens 1, power, the direction of curvature and angle of a lens, the shape of a lens edge, and the drilling angle into the interior of a lens.

Further, even with lenses 1 of the same lens shape, the direction of the non-through-holes are not always the same on the right and left of the lens 1 thereof, and, for example, there are times when the direction of the non-through-holes will differ on the end-piece side and the bridge side. In this case, different types of the above-mentioned drilling jig 3 must be prepared for the right and left of the lens 1, and even in this case, as described hereinabove, since the drilling jig 3 therefor is a small block-shaped member, right-left type differences can easily be handled.

Figure 13:
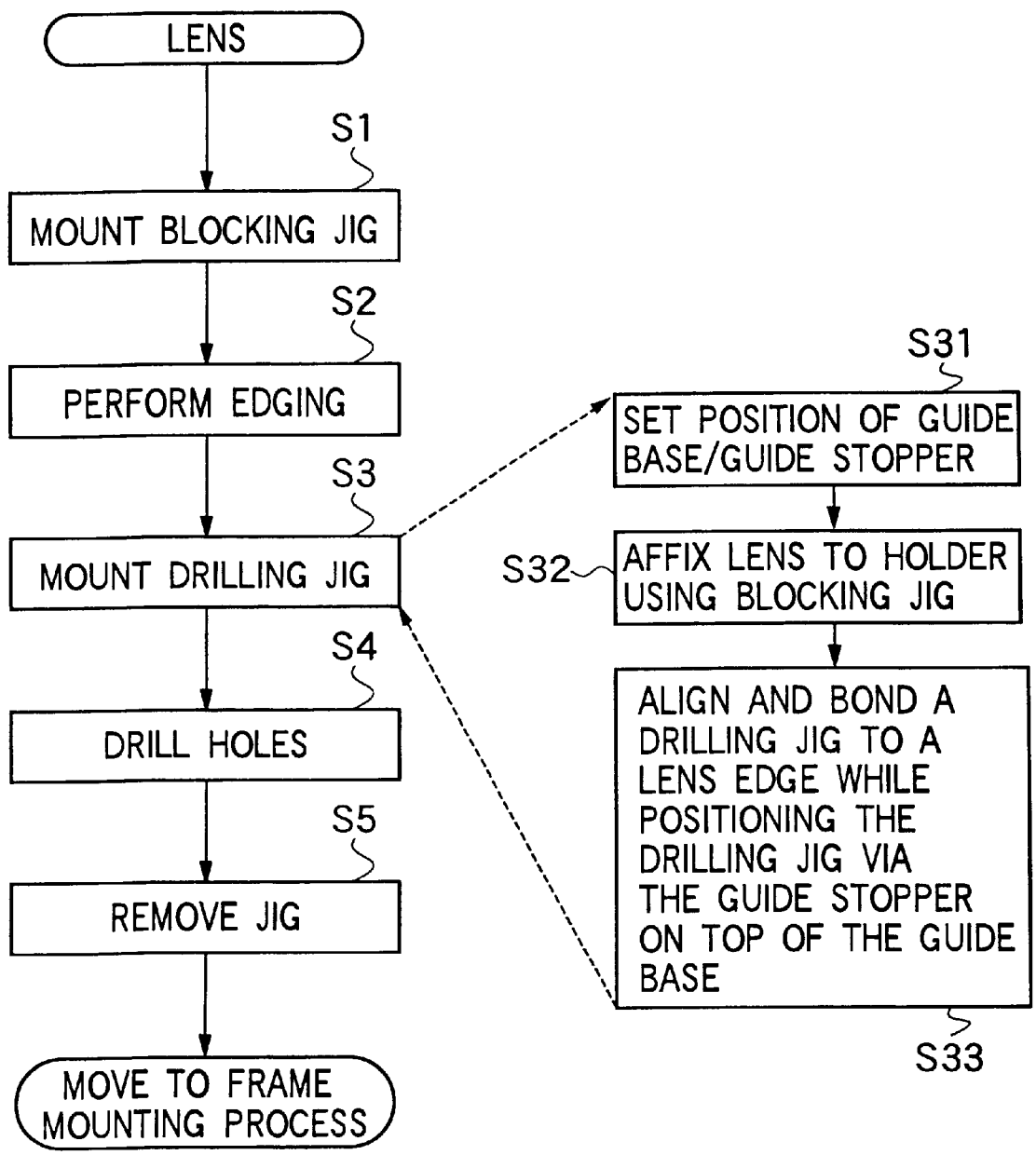
FIG. 13 is a flowchart describing the processing steps of a spectacle lens according to the invention.
Figure 14:
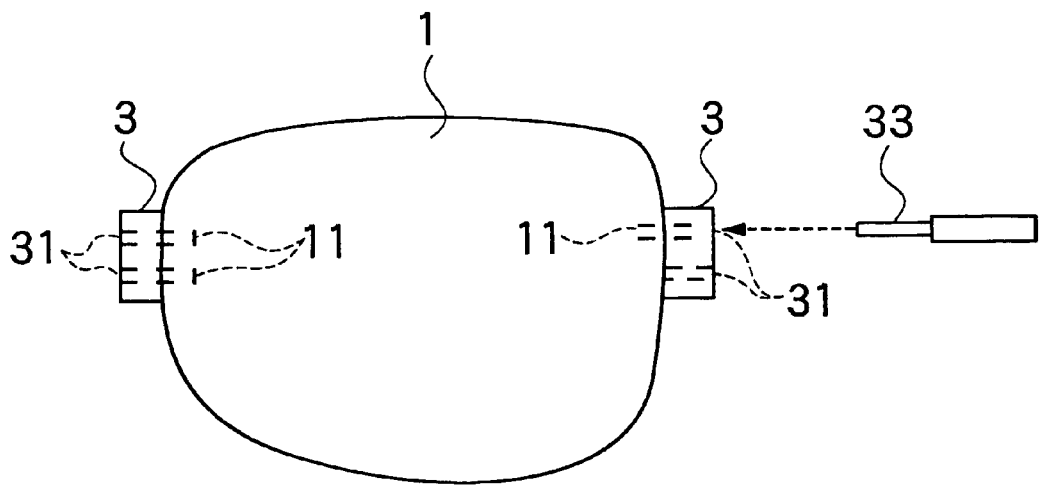
FIGS. 14 and 15 are diagrams showing a method for forming a non-through-hole in an edge of a spectacle lens using a drilling jig.
Figure 15:
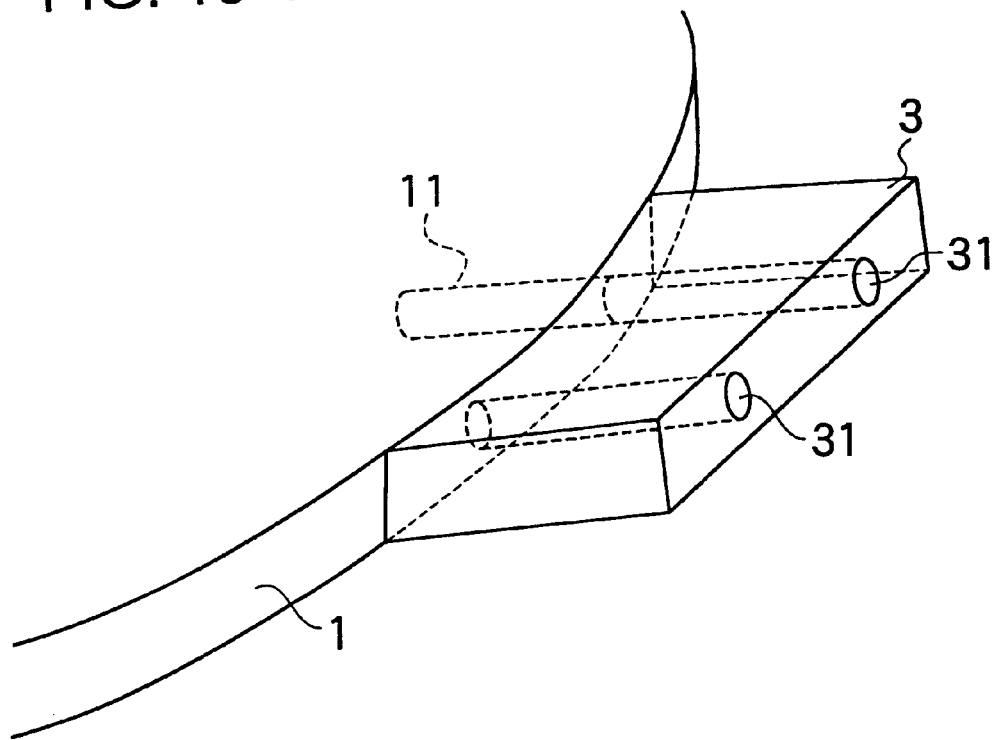
Figure 16:
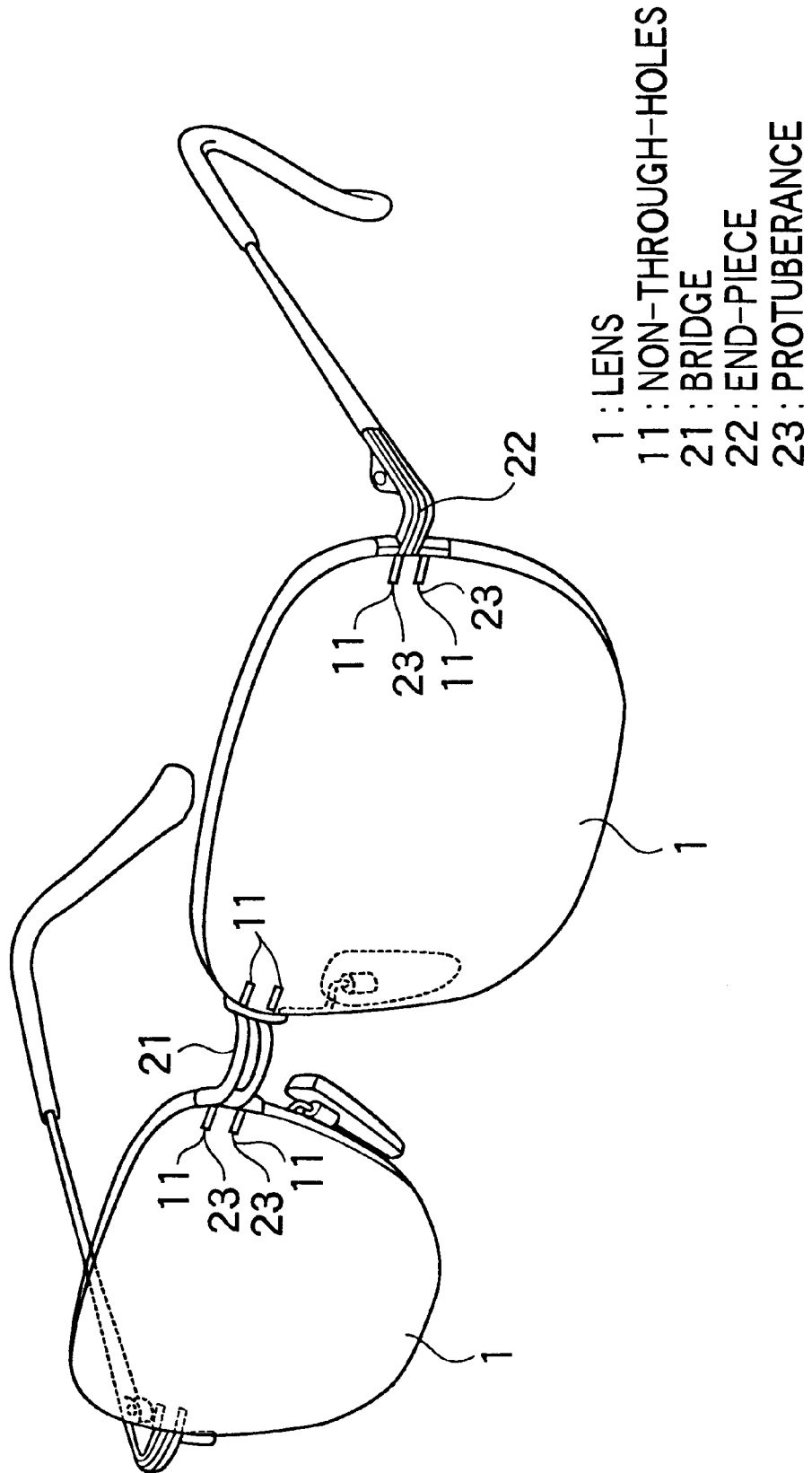
FIG. 16 is an oblique view showing an example of the external appearance of a new type of rimless spectacle lens for which the frame portions were processed using non-through-holes.

FIG. 13 describes via flowcharting the processing steps for a spectacle lens 1 according to the invention.

As shown in this figure, in processing a spectacle lens 1, firstly, a blocking jig 8 is affixed to a lens blank with either two-sided adhesive tape or a suction cup (S1), and edging, which processes a lens contour according to a spectacles wearer's preference, is performed (S2). This edging process is performed by using a blocking jig 8 affixed to a lens 1 as the position reference.

A drilling jig 3 mounting operation is performed in a state in which the edged lens 1 is affixed to the blocking jig 8 as-is (S3).

This drilling jig 3 mounting operation, as explained herein above, can be carried out via an operation (S31) for feeding a guide base 6 and guide stopper 62 to a position set beforehand for each type of lens shape, and an operation (S32) for holding an edged lens 1 in a blocking jig 8, and an operation (S33) for matching up and bonding a drilling jig 3 to a lens edge while positioning the drilling jig 3 on top of the guide surface of a guide base 6 using a guide stopper 62.

Thereafter, a step-type pivot drill is inserted into the drilling jig 3, and non-through-holes are formed in the lens edge (S4).

After the non-through-holes are formed, the drilling jig 3 and blocking jig 8 are both removed (S5), and a frame mounting process for the bridge and end-piece is performed.

When a positioning device for positioning a spectacle lens drilling jig according to the invention is used here, it is possible to position and affix a drilling jig 3 without removing a blocking jig 8, which is affixed to the edged lens, in a state wherein the blocking jig 8 thereof is affixed as-is. Consequently, an effect, whereby the series of operations from the edging of a lens blank to a drilling process can be made more efficient, is also achieved.

As explained hereinabove, the invention is a positioning device for positioning a spectacle lens drilling jig characterized in that it comprises the following constitution.

(1) Lens holder which holds an edged spectacle lens attached to a blocking jig, while determining the position in the direction of rotation in accordance with the above-mentioned blocking jig.

(2) Biaxial free moving device which freely moves the above-mentioned lens holder up-down and right-left, respectively, relative to a lens surface in a state, wherein the position in the direction of rotation is fixed.

(3) A jig guide base having a guide surface on which a small block-shaped drilling jig is placed in a freely moving manner in the direction of the surface.

(4) A guide stopper, which has a guide wall surface that is formed as a surface for intersecting with the above-mentioned guide surface, and which makes contact with and positions the above-mentioned drilling jig, which is guided on top of the above-mentioned guide surface by this guide wall surface.

(5) Feeder which feeds the above-mentioned jig guide base, together with the above-mentioned stopper, in the fore-aft direction relative to a lens surface.

In accordance therewith, it is possible, via a simple structure and simple operations, to position accurately and with good repeatability a drilling jig for processing a non-through-hole from an edge of a spectacle lens toward the inside of the lens for a wide variety of lens shapes.

In addition thereto, an effect, which makes it possible for a series of operations, from the edging of a lens blank to a drilling process, to be made more efficient, is also achieved.

A first preferred feature of the positioning device for positioning a spectacle lens drilling jig characterized in that it comprises a magnetically clamping device which magnetically clamps to the guide wall surface of the guide stopper one side of a drilling jig placed on the guide surface of the jig guide base.

In accordance therewith, it is possible to more easily and smoothly perform an operation for moving a drilling jig along the guide wall surface of the guide stopper, while using the guide wall surface thereof to accurately position the drilling jig on top of the guide surface of the jig guide base.

In this case, methods such as those described hereinbelow can be considered for providing magnetically clamping device. That is, (1) Embed a permanent magnet on the inside of a guide stopper, and, in addition, as the raw material for a drilling jig, use a metal having, for example, iron, nickel or some other magnetic material as a constituent.

(2) Form at the least the guide wall surface part of a guide stopper using a semi-magnetic material that does not cause permanent magnetization, and, in addition, permanently magnetize a drilling jig by forming same using a strong magnetic material that does cause permanent magnetization.

(3) Magnetize both the guide wall surface part of a guide stopper and a drilling jig by forming the two using a semi-magnetic material, and, in addition, cause them to make contact by either mounting in a fixed position or embedding a permanent magnet fragment in the side of either one.

(4) Form both the guide wall surface part of a guide stopper and a drilling jig using a semi-magnetic material, and magnetize either one or both only as needed using an electromagnet.

A second preferred feature of the positioning device for positioning a spectacle lens drilling jig is characterized in that the guide surface on top of the jig guide base is inclined in the direction of a lens edge.

In accordance therewith, matching up the edge of a drilling jig with the edge of a lens can be performed with greater accuracy and more smoothly.

In this case, shown in FIG. 6, because a blocking jig 8 is affixed to the convex surface side of a lens 1 and the edge of the lens 1 is facing diagonally upwards, the guide surface 61 on top of the jig guide base 6 is inclined in the direction in which the guide surface 61 becomes lower as same approaches the lens edge.

However, by contrast thereto, in a case in which a blocking jig 8 is affixed to the concave surface side of a lens 1 and the edge of the lens 1 is facing diagonally downwards, the guide surface 61 on top of the jig guide base 6 can be inclined in the direction in which the guide surface 61 becomes lower the farther away from the lens edge same gets.

A third preferred feature of the positioning device for positioning a spectacle lens drilling jig is characterized in that the guide surface of the jig guide base and guide wall surface of the guide stopper are each formed so as to be symmetrical on the right and left.

In accordance therewith, as shown in FIGS. 3 and 4, lens holder 4 are disposed on both sides of a central jig guide base 6, and the positioning and affixing of drilling jigs 3 to lenses 1 being held by each holder 4 can be performed on both sides of a single jig guide base 6. In accordance therewith, it is possible to cut down the number of feeder 7 which feeds the jig guide base thereof in the fore-aft direction, and, in addition, it is possible to lower the frequency of feed operations in accordance with feeder 7 thereof.

A fourth preferred feature of the positioning device for positioning a spectacle lens drilling jig is characterized in that the feeder includes a means capable of reading the numerical value of the feed position of the jig guide base and guide stopper.

In accordance therewith, an operation for setting with high precision the physical relationship of a jig guide base and a lens can be performed more easily and with increased certainty.

In summary, as is clear from the above explanation, a positioning device for positioning a spectacle lens drilling jig according to the invention achieves an effect such that, when positioning a drilling jig for processing non-through-holes toward the inside of a lens from the edge of an edged lens affixed to a blocking jig, it is possible, via a simple structure and simple operations, to position accurately and with good repeatability the abovementioned drilling jig for a wide variety of lens shapes, and furthermore, it is possible to make a series of operations, from the edging of a lens blank to a drilling process, more efficient, by holding and positioning the above-mentioned lens using the above-mentioned blocking jig, and, in addition, positioning the drilling jig using a feed-set guide base and guide stopper.

What is claimed is:

1. A positioning device for positioning a spectacle lens drilling jig, the device comprising:
    a lens holder which holds an edged spectacle lens affixed to a blocking jig, while determining the position in the direction of rotation in accordance with said blocking jig;
    a biaxial free moving device which freely moves said lens holder up-down and right-left, respectively, relative to a lens surface;
    a jig guide base having a guide surface on which a small block-shaped drilling jig is placed in a freely moving manner parallel to the guide surface;
    a guide stopper, which has a guide wall surface formed as the surface for intersecting with said guide surface, and which comes in contact with and positions said drilling jig, which is guided on said guide surface by this guide wall surface; and
    a feeder which feeds said jig guide base, together with said stopper, in the fore and aft direction relative to said lens surface.

2. The positioning device for positioning a spectacle lens drilling jig according to claim 1, characterized in that the device comprises magnetically clamping device which magnetically clamps to said guide wall surface of said guide stopper one side of a drilling jig placed on said guide surface of said jig guide base.

3. The positioning device for positioning a spectacle lens drilling jig according to claim 1, wherein said guide surface on top of said jig guide base is inclined in a direction where said lens is disposed.

4. The positioning device for positioning a spectacle lens drilling jig according to claim 1, characterized in that said guide surface of said jig guide base and said guide wall surface of said guide stopper are both formed so as to be symmetrical on the right and left.

5. The positioning device for positioning a spectacle lens drilling jig according to claim 3, wherein said guide surface of said jig guide base and said guide wall surface of said guide stopper are both formed so as to be symmetrical on the right and left.

6. The positioning device for positioning a spectacle lens drilling jig according to claim 2, wherein said guide surface on top of said jig guide base is inclined in a direction where said lens is disposed.

7. The positioning device for positioning a spectacle lens drilling jig according to claim 2, wherein said guide surface of said jig guide base and said guide wall surface of said guide stopper are both formed so as to be symmetrical on the right and left.

* * * * *